United States Patent
Shachar et al.

(10) Patent No.: US 12,547,730 B2
(45) Date of Patent: Feb. 10, 2026

(54) AUTOMATED INFORMATION HANDLING SYSTEM HARDENING OPTIMIZATION SYSTEMS AND METHODS

(71) Applicant: Dell Products, L.P., Round Rock, TX (US)

(72) Inventors: Tomer Shachar, Beer-Sheva (IL); Maxim Balin, Gan-Yavne, IL (US); Yevgeni Gehtman, Modi'in (IL)

(73) Assignee: Dell Products, L.P., Round Rock, TX (US)

(*) Notice: Subject to any disclaimer, the term of this patent is extended or adjusted under 35 U.S.C. 154(b) by 572 days.

(21) Appl. No.: 18/045,635

(22) Filed: Oct. 11, 2022

(65) Prior Publication Data

US 2024/0118666 A1    Apr. 11, 2024

(51) Int. Cl.
*G06F 21/57* (2013.01)
*G06F 11/3668* (2025.01)

(52) U.S. Cl.
CPC ........ *G06F 21/577* (2013.01); *G06F 11/3668* (2013.01)

(58) Field of Classification Search
CPC ............................ G06F 21/577; G06F 11/3668
See application file for complete search history.

(56) References Cited

U.S. PATENT DOCUMENTS

| | | | |
|---|---|---|---|
| 10,135,874 B1* | 11/2018 | Perry | G06F 21/54 |
| 12,033,120 B1* | 7/2024 | Stroke | G06Q 20/0658 |
| 2007/0277222 A1* | 11/2007 | Pouliot | G06F 21/577 |
| | | | 726/1 |
| 2016/0359906 A1* | 12/2016 | Lam | G06F 21/629 |

* cited by examiner

*Primary Examiner* — Abdulkader M Alriyashi
(74) *Attorney, Agent, or Firm* — Fogarty LLP

(57) ABSTRACT

Automating Information Handling System (IHS) hardening optimization includes retrieving, from a plurality of IHS hardening configurations, an initial IHS hardening configuration and hardening an IHS based on the initial hardening configuration. An IHS hardening verification tool is then run to verify that the IHS is in compliance with a compliance checklist, if it is, end-to-end tests are run on the IHS, and upon passing the end-to-end tests the initial hardening option is determined to be the best hardening option for the IHS. However, in response to the IHS not passing the end-to-end tests, a next IHS hardening configuration is retrieved and the IHS is hardened based on the next hardening configuration. Running the hardening verification tool and end-to-end tests on the IHS and retrieving a further IHS hardening configuration and hardening the IHS based on the further hardening configuration is repeated, until the IHS passes the end-to-end tests.

20 Claims, 3 Drawing Sheets

AUTOMATED INFORMATION HANDLING SYSTEM HARDENING OPTIMIZATION SYSTEMS AND METHODS

FIELD

This disclosure relates generally to Information Handling Systems (IHSs), and, more specifically, to systems and methods for automated IHS hardening optimization.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In computer security, "hardening" may be a process of securing an IHS by reducing its "surface of vulnerability," which is larger when the IHS performs more functions. Hardening is intended to reduce attack vectors and remediate security risks of the IHS. There are various methods of hardening IHSs, which may involve, among other measures, applying patches to the Operating System (OS) kernel, closing open network ports, setting up intrusion-detection systems, firewalls and intrusion-prevention systems, etc. There are existing hardening scripts and tools that can, for example, deactivate unneeded features in configuration files and/or perform various other protective measures. Still, to comply with security standards deep knowledge and understanding is needed in compliance standards and the OS. For example, the existing approach is to manually harden the IHS and manually check whether the IHS works properly. If not, the hardening configuration is manually changed until the IHS works properly. However, this approach does not verify the compliance of the hardening to hardening standards, such as Security Technical Implementation Guides (STIGs), the United States Department of Commerce National Institute of Standards and testing (NIST), the Center for Internet Security (CIS), International Organization for Standardization (ISO), etc.

SUMMARY

Embodiments of systems and methods for automated Information Handling System (IHS) hardening optimization are described. In an illustrative, non-limiting example automating IHS hardening optimization may include retrieving, from a plurality of IHS hardening configuration options, an initial IHS hardening configuration option and hardening an IHS based, at least in part, on the initial hardening configuration option. Then, an IHS hardening verification tool may be run to verify that the IHS is in compliance with a compliance checklist, and in response to verification that the IHS is in compliance with the compliance checklist, end-to-end tests may be run on the IHS, such that, in response to passing of the end-to-end tests (as well as being in compliance with the compliance checklist), it is determined that the initial hardening option is best hardening option for the IHS.

However, in response to the IHS not passing the end-to-end tests (or in response to the IHS not being in compliance with the compliance checklist), a next (best) IHS hardening configuration option is retrieved from the plurality of IHS hardening configuration options. The IHS is then hardened based, at least in part, on this next hardening configuration option.

Running the IHS hardening verification tool to verify that the IHS is in compliance with the compliance checklist, running the end-to-end tests on the IHS, in response to verification that the IHS is in compliance with the compliance checklist, retrieving a further IHS hardening configuration option from the plurality of IHS hardening configuration options, in response to the IHS not passing the end-to-end tests, and hardening the IHS based, at least in part, on this further hardening configuration option are all repeated until the IHS passes the end-to-end testing (as well as being in compliance with the compliance checklist).

In accordance with various aspects, machine learning may be used to retrieve a next best IHS hardening configuration option from the plurality of IHS hardening configuration options as the next IHS hardening configuration option, in response to the subject IHS not being in compliance with the compliance checklist, and/or in response to the subject IHS not passing the end-to-end tests.

However, in accordance with various aspects, stability of the IHS may also be checked after (each) running the end-to-end tests on the IHS. In accordance with various aspects, the IHS hardening verification tool may be of an IHS hardening verification tool of (e.g., created by) the manufacturer of the IHS. In accordance with various aspects, the compliance checklist may be a United States Department of Commerce National Institute for Standards and Testing National Checklist Program (NIST NCP) checklist that conforms to the Security Content Automation Protocol (SCAP). However, in accordance with various (other) aspects, the compliance checklist may (likewise) be of a compliance checklist of (e.g., created by) the manufacturer of the IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
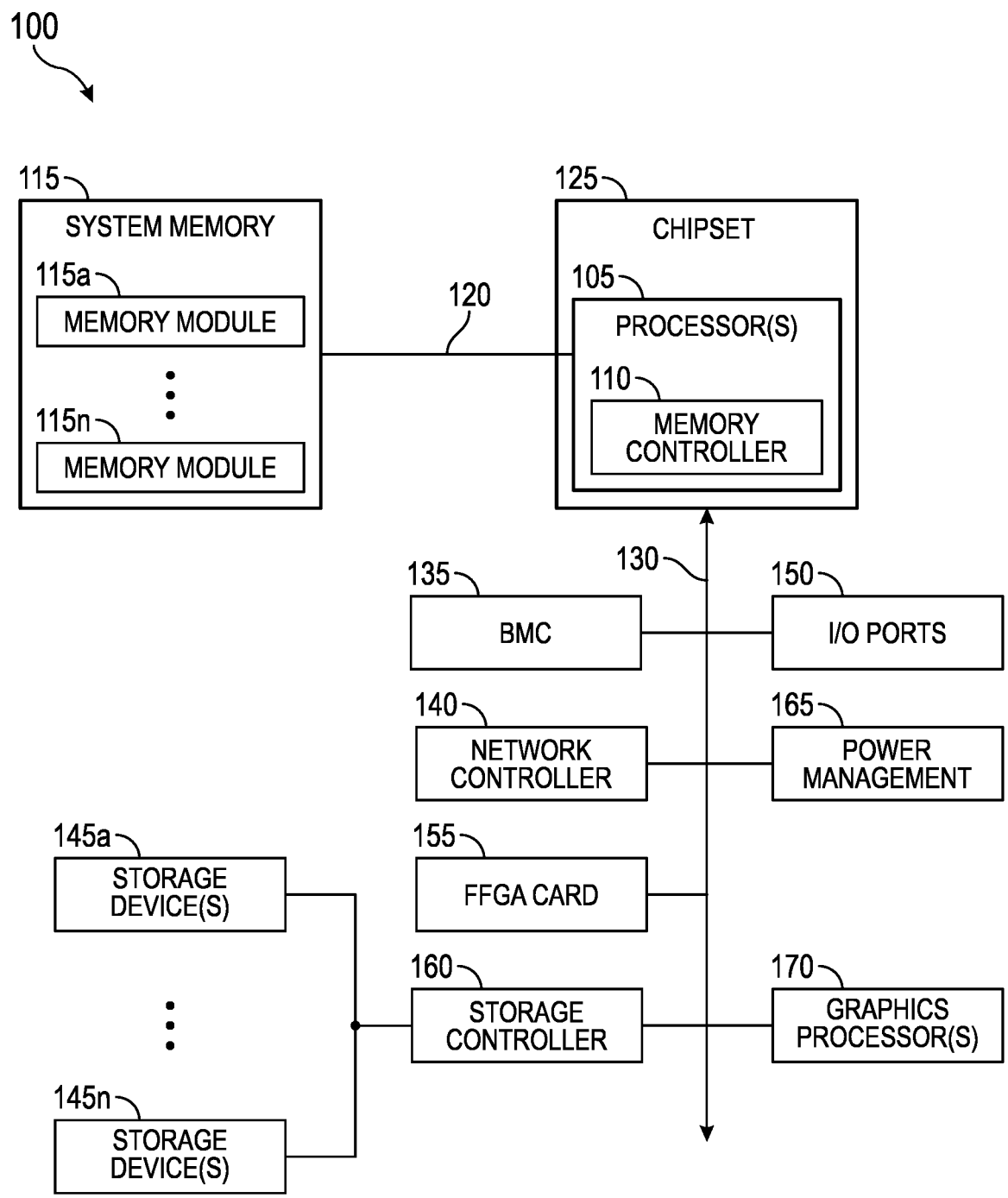
FIG. 1 is a block diagram illustrating example components of an example of an Information Handling System (IHS), according to some embodiments.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components. More detailed example IHS 100 is described with respect to FIG. 1.

To wit, IHS 100 may utilize one or more processors 105. In some embodiments, processors 105 may include a main processor and a co-processor, each of which may include a plurality of processing cores that, in certain scenarios, may each be used to run an instance of a server process. In certain embodiments, one or all of processor(s) 105 may be graphics processing units (GPUs) in scenarios where IHS 100 has been configured to support functions such as multimedia services and graphics applications.

As illustrated, processor(s) 105 includes an integrated memory controller 110 that may be implemented directly within the circuitry of the processor 105, or the memory controller 110 may be a separate integrated circuit that is located on the same die as the processor 105. The memory controller 110 may be configured to manage the transfer of data to and from the system memory 115 of the IHS via a high-speed memory interface 120. The system memory 115 is coupled to processor(s) 105 via a memory bus 120 that provides the processor(s) 105 with high-speed memory used in the execution of computer program instructions by the processor(s) 105. Accordingly, system memory 115 may include memory components, such as static RAM (SRAM), dynamic RAM (DRAM), NAND Flash memory, suitable for supporting high-speed memory operations by the processor(s) 105. In certain embodiments, system memory 115 may combine both persistent, non-volatile memory and volatile memory.

In certain embodiments, the system memory 115 may be comprised of multiple removable memory modules. The system memory 115 of the illustrated embodiment includes removable memory modules 115a-n. Each of the removable memory modules 115a-n may correspond to a printed circuit board memory socket that receives a removable memory module 115a-n, such as a DIMM (Dual In-line Memory Module), that can be coupled to the socket and then decoupled from the socket as needed, such as to upgrade memory capabilities or to replace faulty memory modules. Other embodiments of IHS memory 115 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 100 may utilize chipset 125 that may be implemented by integrated circuits that are coupled to processor(s) 105. In this embodiment, processor(s) 105 is depicted as a component of chipset 125. In other embodiments, all of chipset 125, or portions of chipset 125 may be implemented directly within the integrated circuitry of processor(s) 105. The chipset may provide the processor(s) 105 with access to a variety of resources accessible via one or more buses 130. Various embodiments may utilize any number of buses to provide the illustrated pathways served by bus 130. In certain embodiments, bus 130 may include a PCIe switch fabric that is accessed via a PCIe root complex.

As illustrated, IHS 100 includes BMC 135 to provide capabilities for remote monitoring and management of various aspects of IHS 100. In support of these operations, BMC 135 may utilize both in-band, sideband and/or out of band communications with certain managed components of IHS 100, such as, for example, processor(s) 105, system memory 115, chipset 125, network controller 140, storage device(s) 145(a-n), etc. BMC 135 may be installed on the motherboard of IHS 100 or may be coupled to IHS 100 via an expansion slot provided by the motherboard. As a non-limiting example of a BMC, the integrated Dell Remote Access Controller (iDRAC) from Dell® is embedded within Dell PowerEdge™ servers and provides functionality that helps information technology (IT) administrators deploy, update, monitor, and maintain servers remotely. BMC 135 may include non-volatile memory having program instructions stored thereon that are usable by CPU(s) 105 to enable remote management of IHS 100. For example, BMC 135 may enable a user to discover, configure, and manage BMC 135, setup configuration options, resolve and administer hardware or software problems, etc. Additionally, or alternatively, BMC 135 may include one or more firmware volumes, each volume having one or more firmware files used by the BIOS' firmware interface to initialize and test components of IHS 100.

IHS 100 may also include the one or more I/O ports 150, such as USB ports, PCIe ports, TPM (Trusted Platform Module) connection ports, HDMI ports, audio ports, docking ports, network ports, Fibre Channel ports and other storage device ports. Such I/O ports 150 may be externally accessible or may be internal ports that are accessed by opening the enclosure of the IHS 100. Through couplings made to these I/O ports 150, users may couple the IHS 100 directly to other IHSs, storage resources, external networks and a vast variety of peripheral components.

As illustrated, IHS 100 may include one or more FPGA (Field-Programmable Gate Array) cards 155. Each of the FPGA card 155 supported by IHS 100 may include various processing and memory resources, in addition to an FPGA logic unit that may include circuits that can be reconfigured after deployment of IHS 100 through programming functions supported by the FPGA card 155. Through such reprogramming of such logic units, each individual FGPA card 155 may be optimized to perform specific processing tasks, such as specific signal processing, security, data mining, and artificial intelligence functions, and/or to support specific hardware coupled to IHS 100. In some embodiments, a single FPGA card 155 may include multiple FPGA logic units, each of which may be separately programmed to implement different computing operations, such as in computing different operations that are being offloaded from processor 105.

IHS 100 may include one or more storage controllers 160 that may be utilized to access storage devices 145a-n that are accessible via the chassis in which IHS 100 is installed.

Storage controller 160 may provide support for RAID (Redundant Array of Independent Disks) configurations of logical and physical storage devices 145a-n. In some embodiments, storage controller 160 may be an HBA (Host Bus Adapter) that provides more limited capabilities in accessing physical storage devices 145a-n. In some embodiments, storage devices 145a-n may be replaceable, hot-swappable storage devices that are installed within bays provided by the chassis in which IHS 100 is installed. In embodiments where storage devices 145a-n are hot-swappable devices that are received by bays of chassis, the storage devices 145a-n may be coupled to IHS 100 via couplings between the bays of the chassis and a midplane of IHS 100. In some embodiments, storage devices 145a-n may also be accessed by other IHSs that are also installed within the same chassis as IHS 100. Storage devices 145a-n may include SAS (Serial Attached SCSI) magnetic disk drives, SATA (Serial Advanced Technology Attachment) magnetic disk drives, solid-state drives (SSDs) and other types of storage devices in various combinations.

Processor(s) 105 may also be coupled to a network controller 140 via bus 130, such as provided by a Network Interface Controller (NIC) that allows the IHS 100 to communicate via an external network, such as the Internet or a LAN. In some embodiments, network controller 140 may be a replaceable expansion card or adapter that is coupled to a motherboard connector of IHS 100. In some embodiments, network controller 140 may be an integrated component of IHS 100.

A variety of additional components may be coupled to processor(s) 105 via bus 130. For instance, processor(s) 105 may also be coupled to a power management unit 165 that may interface with a power supply of IHS 100. In certain embodiments, a graphics processor 170 may be comprised within one or more video or graphics cards, or an embedded controller, installed as components of the IHS 100.

In certain embodiments, IHS 100 may operate using a BIOS (Basic Input/Output System) that may be stored in a non-volatile memory accessible by the processor(s) 105. The BIOS may provide an abstraction layer by which the operating system of the IHS 100 interfaces with the hardware components of the IHS. Upon powering or restarting IHS 100, processor(s) 105 may utilize BIOS instructions to initialize and test hardware components coupled to the IHS, including both components permanently installed as components of the motherboard of IHS 100, and removable components installed within various expansion slots supported by the IHS 100. The BIOS instructions may also load an operating system for use by the IHS 100. In certain embodiments, IHS 100 may utilize Unified Extensible Firmware Interface (UEFI) in addition to or instead of a BIOS. In certain embodiments, the functions provided by a BIOS may be implemented, in full or in part, by the remote access controller 135. In some embodiments, BIOS may be configured to identify hardware components that are detected as being currently installed in IHS 100. In such instances, the BIOS may support queries that provide the described unique identifiers that have been associated with each of these detected hardware components by their respective manufacturers. In providing an abstraction layer by which hardware of IHS 100 is accessed by an operating system, BIOS may identify the I/O ports 150 that are recognized and available for use.

In some embodiments, IHS 100 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 100. These calculated hash values may then be compared against reference hash values that were previously stored in a secure non-volatile memory of the IHS, such as during factory provisioning of IHS 100. In this manner, a TPM may establish a root of trust that includes core components of IHS 100 that are validated as operating using instructions that originate from a trusted source.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 105 as a systems-on-a-chip.

A person of ordinary skill in the art will appreciate that IHS 100 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

A person of ordinary skill will recognize that IHS 100 of FIG. 1 is only one example of a system in which the certain embodiments may be utilized. Indeed, while IHS 100 is generally described as a server, or the like, the embodiments described herein may be used in various electronic devices, such as laptop computers, desktop computers, network router devices, televisions, custom telecommunications equipment for special purpose use, etc. That is, certain techniques described herein are in no way limited to use with IHS 100 of FIG. 1.

It may be appropriate, such as for security reasons, to have as "slim" an Operating System (OS) and "hardening" of the OS as practical (or possible), so as, to preserve principles of "least functionality," or the like. Although there are security tools that are designed to preserve a hardening configuration, the main challenge and very complex task is optimizing the hardening and creation of a hardening profile for a specific IHS. For example, each IHS may have a different set of applications that influence on the hardening profile, directly, or indirectly. Thus, it may be suitable that an IHS's OS, the most secured one, should be hardened to provide only services that that particular IHS is designed for. As noted, the hardening process reduces attack vectors and remediate security risks of the IHS. Another challenge is to create a "seamless" hardening profile that provides the desired level of protection without affecting performance of the IHS.

There are two main challenges with existing, manual, hardening processes. First, hardening may impact the operation and/or performance of the IHS. So, after hardening, full end-to-end testing of the IHS is typically carried out. End-to-end testing, also known as E2E testing, is a testing methodology that confirms that IHS processes and applications behave as expected and that the flow of data is maintained for all types of (user) tasks and processes in the tested IHS. If the end-to-end testing fails, the hardening is reset, and end-to-end testing is repeated. This process is repeated, in a manual fashion, until the IHS passes all the end-to-end tests and complies with industry hardening requirements. It is very long and complicated process that require great manual effort. Secondly, hardening, that is implementing security functionality that reduce attack vectors and remediate security risks of the IHS, requires deep personal knowledge of the IHS's OS configuration, and also personal knowledge of the hardening standards that are required by the industry, such as Security Technical Implementation Guides (STIGs), the United States Department of Commerce National Institute of Standards and testing (NIST), the Center for Internet Security (CIS), International Organization for Standardization (ISO), etc., by the person or persons carrying out the hardening and testing process.

Embodiments of the present systems and methods afford an ability for an IHS to comply with industry security compliance "out of the box" (i.e., immediate compliance with industry security standards, usability and functionality of a newly purchased IHS) through implementation of automated IHS hardening optimization.

Figure 2:
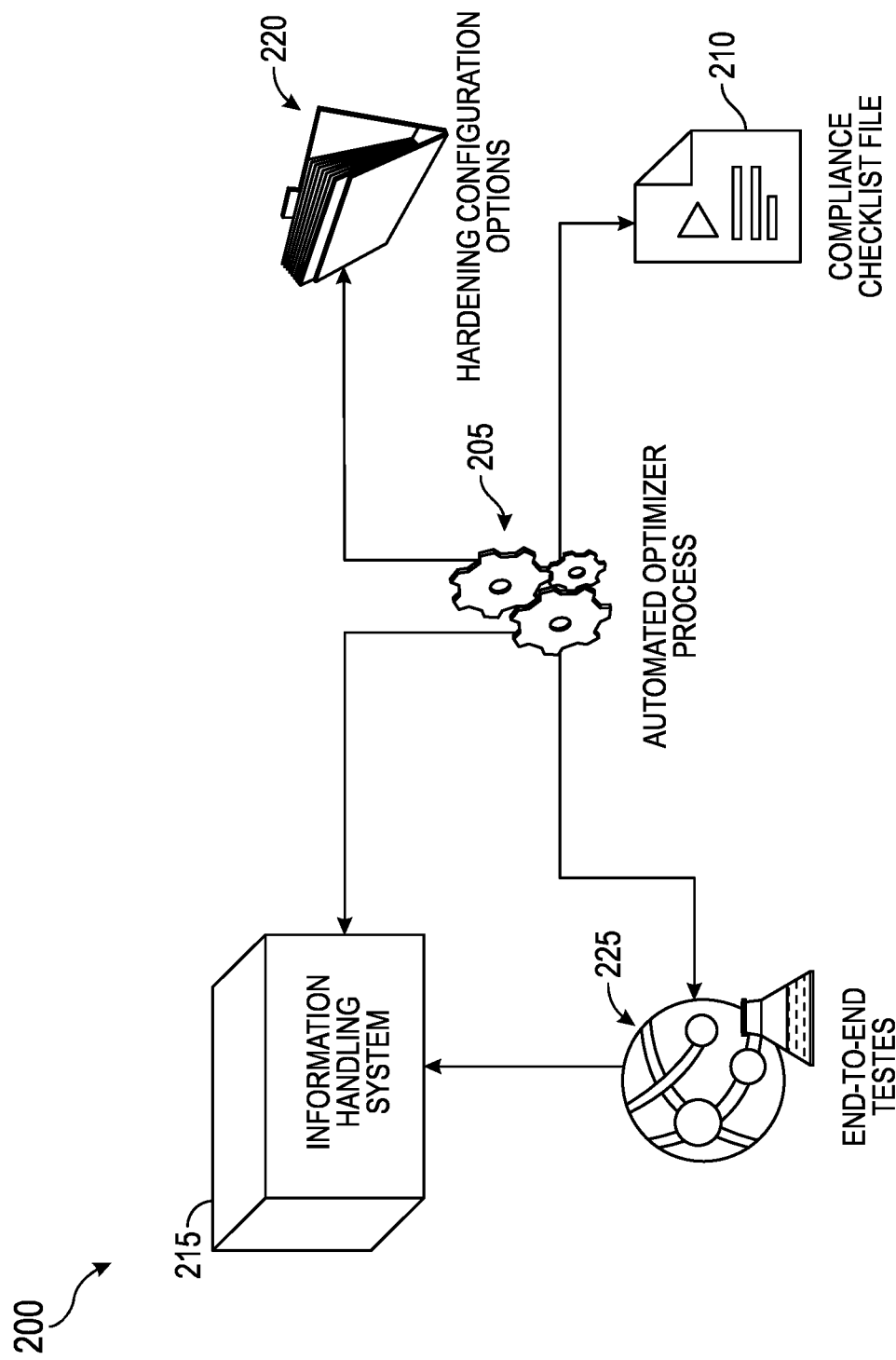
FIG. 2 is a diagram of an example automated IHS hardening optimization system and/or method environment, according to some embodiments.

FIG. 2 is a diagram of automated IHS hardening optimization system and/or method environment 200, according to some embodiments. Various embodiments of the present systems and methods, such as implemented via automated IHS hardening optimizer process 205, may employ compliance configuration checklist file 210, which is a set of rules that verify IHS 215 meets a chosen hardening standard. This checklist may be taken from an existing standard, such as from NIST National Checklist Repository (NCP), but also can be created by an IHS manufacturer, configurer, or the like. In accordance with embodiments of the present systems and methods, automated IHS hardening optimizer process 205 may use verification tools (as discussed) to retrieve one or more of checklists 210 and run this (these) checklists in the IHS. That is, the hardening verification tool, a component that carries out a compliance check, may, in accordance with embodiments of the present systems and methods, execute checks over the IHS applications to obtain a result, for example, a query under a specific configuration, while checklist 210 specifies what should be the result of the compliance check. This (these) verification tool(s) may be a capability implemented by an IHS manufacturer, configurer, or the like, and/or may be a solution in the industry, such as by way of example, Open Security Content Automation Protocol (OpenSCAP), an open source verification tool using the U.S. SCAP standard maintained by NIST.

Automated IHS hardening optimization system and/or method environment 200 may also include hardening configuration options 220, each of which may be a set of configurations that will be used by automated IHS hardening optimizer process 205, such as discussed below, for configuring IHS 215. As likewise discussed in greater detail below, automated IHS hardening optimizer process 205 may make use of (predefined) end-to-end tests 225, applied to IHS 215. As implemented in accordance with embodiments of the present systems and methods, end-to-end testing checks operation of the IHS from start to end, by checking that all the functionality of applications on the IHS are working as planned and that the IHS passes all acceptance criteria for release to the market as a product.

Thusly, automated IHS hardening optimizer process 205 retrieves, or otherwise includes and/or incorporates, compliance configuration checklist file(s) 210, hardening configuration option(s) 220 and end-to-end tests 225 to provide automated hardening optimization of IHS 215, in accordance with embodiments of the present systems and methods.

Figure 3:
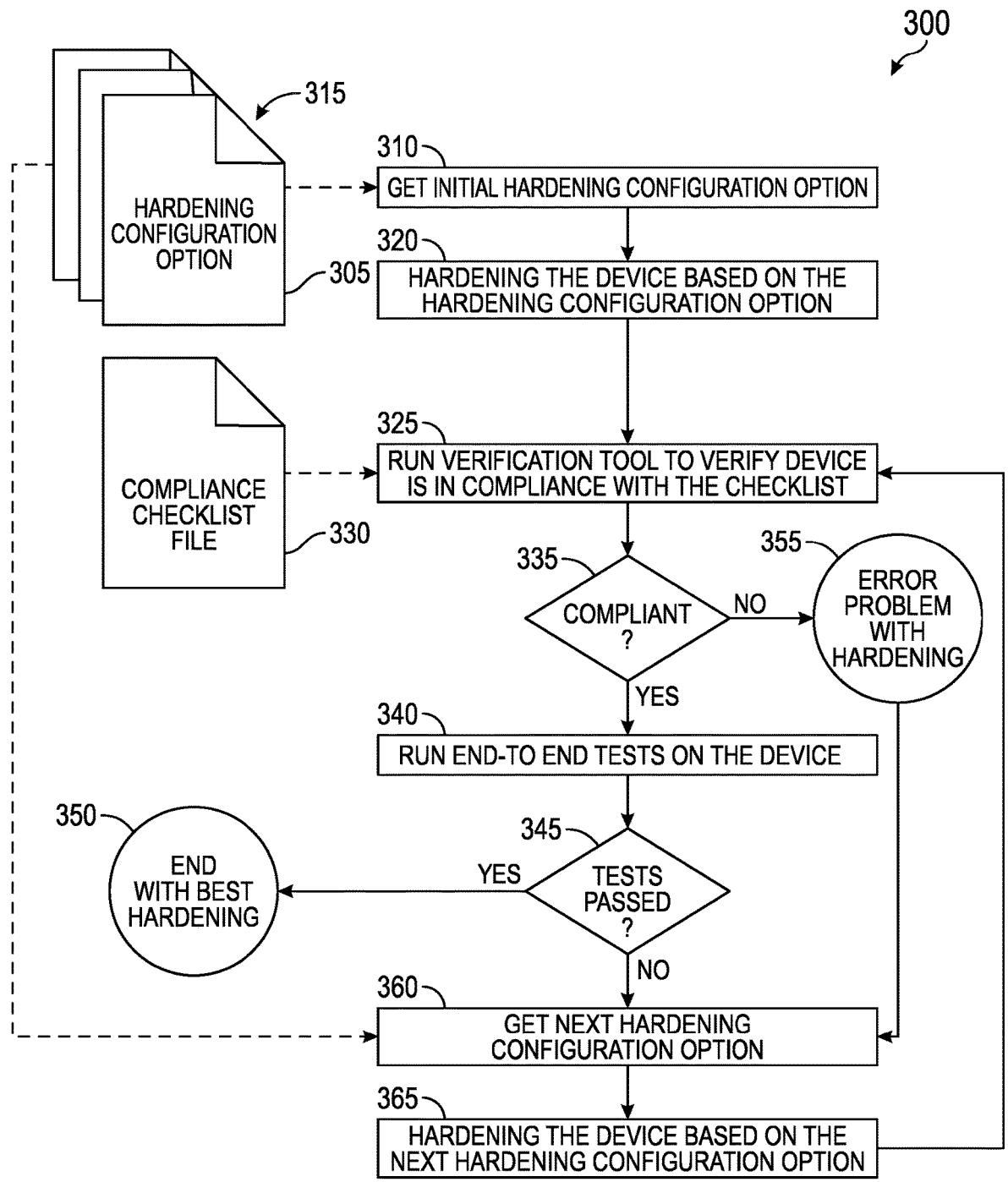
FIG. 3 is a flowchart of an example automated information handling system hardening optimization process, according to some embodiments.

FIG. 3 is a flowchart of example automated IHS hardening optimization process 300, according to some embodiments, such as to implement automated IHS hardening optimizer process 205 described above. In accordance with the foregoing, and as described in greater detail below, example automated IHS hardening optimization process 300 hardens the IHS (215) based on definitions (210 and 220) and is a fully automation process that not only hardens the IHS, but also runs (predefined) end-to-end tests (225), to thereby, check stability of the IHS.

In automated IHS hardening optimization process 300 an initial (first) IHS hardening configuration option 305 is retrieved, at 310, from a plurality of IHS hardening configuration options 315 (e.g., hardening configuration options 220). This first or initial, IHS hardening configuration option 305 may, in accordance with embodiments of the present systems and methods, be a most secure hardening configuration option for the particular IHS. By way of example, this first, best IHS hardening configuration option 305 may be a IHS hardening configuration option based on a configuration that was pre-defined as a best "acceptable configuration," such as by IHS architects or product management personnel of an IHS manufacturer. Meanwhile, IHS hardening configuration options 315 are a set of configurations that were pre-defined as "acceptable configurations," such as by such IHS architects or product management personnel of the IHS manufacturer.

At 320 the IHS is hardened, based, at least in part, on initial hardening configuration option 305, then at 325 an IHS hardening verification tool is run to verify that the IHS is in compliance with compliance checklist 330 (retrieved one or more of checklists 210). As noted, the "hardening verification tool" is a component that carries out a compliance check, such as by executing checks over the IHS applications to obtain a result, for example, a query under a specific configuration. As also noted, the checklist (210) specifies what should be the result of the compliance check. For example, if the hardening verification tool issues a query for "there are users with root permission expect root user" in the checklist, the expected result is "no," if the hardening verification tool receives "yes," this means the check failed.

In response to verification at 335 that the IHS is in compliance with the compliance checklist (per the verification tool run at 325) (an) (predefined) end-to-end test(s) are (is) run on the IHS at 340. Further, or as a part of running the end-to-end tests at 340, stability of the IHS may be checked and confirmed. At 345 a determination is made, in response to passing of the end-to-end tests run at 340, that the initial hardening option retrieved at 310 is best hardening option 350 for the IHS.

However, in response to error 355 resulting from a problem with the (initial) hardening, determined at 335, that the IHS is not in compliance with the compliance checklist (per the verification tool run at 325) following application of the (initial) hardening configuration option, or in response to the IHS not passing the end-to-end tests, as determined at 345, a next IHS hardening configuration option is retrieved at 360, from plurality of IHS hardening configuration options 315. This next IHS hardening configuration option may, in accordance with embodiments of the present systems and methods, be a next most secure hardening configuration option for the particular IHS, as compared to first IHS hardening configuration option 305. By way of example, this next best IHS hardening configuration option may be a IHS hardening configuration option based on use by an administrative user, or the like. For example, this next (i.e., the next best) IHS hardening configuration option may also be an IHS hardening configuration option based on a configuration that was pre-defined as an "acceptable configuration," from IHS hardening configuration options 315 that were pre-defined as "acceptable configurations," from IHS architects or product management personnel of the IHS manufacturer, or the like. Alternatively, or additionally, Machine Learning (ML), or the like, may be used to choose this next (i.e., the next best) IHS hardening configuration option. Then hardening the IHS based, at least in part, on the next hardening configuration option is carried out at 365. Thereafter, the above steps are repeated until the IHS passes the end-to-end tests run at 340.

For example, running of the IHS hardening verification tool at 325 to verify that the IHS is in compliance with the compliance checklist is repeated, then if the IHS is determined to be in compliance with the compliance checklist at 335, the (predefined) end-to-end test(s) is (are) again run on the IHS at 340. Again, as a part of running the end-to-end tests at 340 or a further check, stability of the IHS may be confirmed. It is then determined at 345 that this next hardening option is best hardening option 350 for the IHS, in response to the IHS passing the end-to-end tests re-run at 340.

However, in response to the IHS not passing the end-to-end tests run at 340, or in response to an(other) error 355 resulting from a problem with the (next) hardening, determination at 335, that the IHS is not in compliance with the compliance checklist (per the verification tool re-run at 325) following application of the (next) hardening configuration option, a further IHS hardening configuration option from plurality of IHS hardening configuration options 315 is retrieved at 360. This further IHS hardening configuration option may, in accordance with embodiments of the present systems and methods, be a further next most secure hardening configuration option for the particular IHS, as compared to "next" IHS hardening configuration option retrieved at 360. By way of example, this next best IHS hardening configuration option may be a IHS hardening configuration option based on use by another user, or the like. In some embodiments, ML, or the like may be used to choose the "next best" IHS hardening configuration option. The IHS is then again hardened, at 365, based, at least in part, on this further hardening configuration option and the above steps are repeated, as illustrated in FIG. 3, until the IHS passes the end-to-end tests run at 340 and best hardening option 350 for the IHS is determined at 345.

In accordance with the foregoing, embodiments of the present systems and methods provide an automated optimizer process for hardening an IHS based on industry standards by solving the aforementioned two different challenges in one manner. Embodiments of the present systems and methods provide the best hardening for an IHS, in an expedient manner, without risk of the IHS not working properly. The present automated optimizer processes and systems leverage a set of technics and use them in operation, as discussed above, such as with respect to FIG. 3.

It should be understood that various operations described herein may be implemented in software executed by processing circuitry, hardware, or a combination thereof. For example, embodiments of the present systems and methods may be implemented (205) in an (first) IHS to provide automated IHS hardening optimization in a subject (second) IHS (215). The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

To implement various operations described herein, computer program code (i.e., instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

As noted, in various embodiments, aspects of systems and methods described herein may be implemented, at least in part, using ML. As used herein, the terms "machine learning" or "ML" refer to one or more algorithms that implement: a neural network (e.g., artificial neural network, deep neural network, convolutional neural network, recurrent neural network, autoencoders, reinforcement learning, etc.), fuzzy logic, artificial intelligence (AI), deep learning, deep structured learning hierarchical learning, support vector machine (SVM) (e.g., linear SVM, nonlinear SVM, SVM regression, etc.), decision tree learning (e.g., classification and regression tree or "CART"), Very Fast Decision Tree (VFDT), ensemble methods (e.g., ensemble learning, Random Forests, Bagging and Pasting, Patches and Subspaces, Boosting, Stacking, etc.), dimensionality reduction (e.g., Projection, Manifold Learning, Principal Components Analysis, etc.), or the like.

Non-limiting examples of publicly available machine learning algorithms, software, and libraries that may be utilized within embodiments of systems and methods described herein include, but are not limited to: PYTHON, OPENCV, INCEPTION, THEANO, TORCH, PYTORCH, PYLEARN2, NUMPY, BLOCKS, TENSORFLOW, MXNET, CAFFE, LASAGNE, KERAS, CHAINER, MATLAB Deep Learning, CNTK, MatConvNet (a MATLAB toolbox implementing convolutional neural networks for computer vision applications), DeepLearnToolbox (a Matlab toolbox for Deep Learning from Rasmus Berg Palm), BigDL, Cuda-Convnet (a fast C++/CUDA implementation of convolutional or feed-forward neural networks), Deep Belief Networks, RNNLM, RNNLIB-RNNLIB, matrbm, deeplearning4j, Eblearn.lsh, deepmat, MShadow, Matplotlib, SciPy, CXXNET, Nengo-Nengo, Eblearn, cudamat, Gnumpy, 3-way factored RBM and mcRBM, mPoT, ConvNet, ELEKTRONN, OpenNN, NEURALDESIGNER, Theano Generalized Hebbian Learning, Apache SINGA, Lightnet, and SimpleDNN.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. A method for automating information handling system hardening optimization, the method comprising:
   retrieving, from a plurality of information handling system hardening configuration options, an initial information handling system hardening configuration option;
   hardening an information handling system based, at least in part, on the initial hardening configuration option;
   running an information handling system hardening verification tool to verify that the information handling system is in compliance with a compliance checklist;
   running, in response to verification that the information handling system is in compliance with the compliance checklist, end-to-end tests on the information handling system;
   determining, in response to passing of the end-to-end tests, the initial hardening option is a best hardening option for the information handling system;
   retrieving, in response to the information handling system not passing the end-to-end tests, a next information handling system hardening configuration option from the plurality of information handling system hardening configuration options;
   hardening the information handling system based, at least in part, on the next hardening configuration option; and
   repeating, until the information handling system passes the end-to-end tests:
      running the information handling system hardening verification tool to verify that the information handling system is in compliance with the compliance checklist;
      running, in response to verification that the information handling system is in compliance with the compliance checklist, the end-to-end tests on the information handling system;
      determining, in response to passing of the end-to-end tests, the next hardening option is the best hardening option for the information handling system;
      retrieving, in response to the information handling system not passing the end-to-end tests, a further information handling system hardening configuration option from the plurality of information handling system hardening configuration options; and
      hardening the information handling system based, at least in part, on the further hardening configuration option.

2. The method of claim 1, further comprising:
   retrieving the next information handling system hardening configuration option from the plurality of information handling system hardening configuration options, in response to the information handling system not being in compliance with the compliance checklist following hardening the information handling system based, at least in part, on the initial hardening configuration option; and retrieving the further information handling system hardening configuration option from the plurality of information handling system hardening configuration options, in response to the information handling system not being in compliance with the compliance checklist following hardening the information handling system based, at least in part, on the next hardening configuration option.

3. The method of claim 2, wherein retrieving, in response to the information handling system not passing the end-to-end tests, the next information handling system hardening configuration option from the plurality of information handling system hardening configuration options, retrieving, in response to the information handling system not passing the end-to-end tests, the further information handling system hardening configuration option from the plurality of information handling system hardening configuration options, retrieving the next information handling system hardening configuration option from the plurality of information handling system hardening configuration options, in response to the information handling system not being in compliance with the compliance checklist following hardening the information handling system based, at least in part, on the initial hardening configuration option, and/or retrieving the further information handling system hardening configuration option from the plurality of information handling system hardening configuration options, in response to the information handling system not being in compliance with the compliance checklist following hardening the information handling system based, at least in part, on the next hardening configuration option further comprises using machine learning to choose a next best or further best information handling system hardening configuration option compared to the initial information handling system hardening configuration option or next information handling system hardening configuration option, respectively.

4. The method of claim 1, further comprising checking stability of the information handling system after running the end-to-end tests on the information handling system.

5. The method of claim 1, wherein the compliance checklist comprises a United States Department of Commerce National Institute for Standards and Testing National Checklist Program checklist that conforms to a Security Content Automation Protocol.

6. The method of claim 1, further comprising creating the information handling system hardening verification tool.

7. The method of claim 1, further comprising creating the compliance checklist.

8. A non-transitory computer-readable storage medium storing program instructions, thereupon, that upon execution by an information handling system causes the information handling system to:

retrieve an initial information handling system hardening configuration option, from a plurality of information handling system hardening configuration options;

harden a subject information handling system based, at least in part, on the initial hardening configuration option;

run an information handling system hardening verification tool to verify that the subject information handling system is in compliance with a compliance checklist;

run end-to-end tests on the subject information handling system, in response to verification that the subject information handling system is in compliance with the compliance checklist;

determine that the initial hardening option is a best hardening option for the subject information handling system, in response to passing of the end-to-end tests; and repeat, in response to the subject information handling system not passing the end-to-end tests, and until a determination of a hardening option of the plurality of information handling system hardening configuration options is best hardening option for the subject information handling system:

retrieve a next information handling system hardening configuration option from the plurality of information handling system hardening configuration options;

harden the subject information handling system based, at least in part, on the next hardening configuration option;

run the information handling system hardening verification tool to verify that the subject information handling system is in compliance with the compliance checklist;

run the end-to-end tests on the subject information handling system, in response to verification that the subject information handling system is in compliance with the compliance checklist; and determine the next hardening option is the best hardening option for the subject information handling system, in response to passing of the end-to-end tests.

9. The non-transitory computer-readable storage medium of claim 8, wherein, upon execution by the information handling system, the program instructions cause the information handling system to:

repeat, in response to the subject information handling system not being in compliance with the compliance checklist following hardening the subject information handling system based, at least in part, on the initial hardening configuration option, and until the determination of a hardening option of the plurality of information handling system hardening configuration options is a best hardening option for the subject information handling system:

retrieve the next information handling system hardening configuration option from the plurality of information handling system hardening configuration options;

harden the subject information handling system based, at least in part, on the next hardening configuration option;

run the information handling system hardening verification tool to verify that the subject information handling system is in compliance with the compliance checklist;

run the end-to-end tests on the subject information handling system, in response to verification that the subject information handling system is in compliance with the compliance checklist; and determine the next hardening option is the best hardening option for the subject information handling system in response to passing of the end-to-end tests.

10. The non-transitory computer-readable storage medium of claim 9, wherein, upon execution by the information handling system, the program instructions cause the information handling system to use machine learning to retrieve a next best information handling system hardening configuration option from the plurality of information handling system hardening configuration options as the next information handling system hardening configuration option, in response to the subject information handling system not being in compliance with the compliance checklist, and/or in response to the subject information handling system not passing the end-to-end tests.

11. The non-transitory computer-readable storage medium of claim 8, wherein, upon execution by the information handling system, the program instructions cause the information handling system to check stability of the subject information handling system after running the end-to-end tests on the subject information handling system.

12. The non-transitory computer-readable storage medium of claim 8, wherein the compliance checklist is a United States Department of Commerce National Institute for Standards and Testing National Checklist Program checklist that conforms to a Security Content Automation Protocol.

13. The non-transitory computer-readable storage medium of claim 8, wherein the information handling system hardening verification tool is an information handling system hardening verification tool of a manufacturer of the information handling system.

14. The non-transitory computer-readable storage medium of claim 8, wherein the compliance checklist is a compliance checklist of a manufacturer of the information handling system.

15. A method comprising:
retrieving an initial information handling system hardening configuration option from a plurality of information handling system hardening configuration options;
hardening the information handling system based, at least in part, on the initial hardening configuration option;
running an information handling system hardening verification tool to verify that the information handling system is in compliance with a compliance checklist;
running end-to-end tests on the information handling system, in response to verification that the information handling system is in compliance with the compliance checklist;
determining whether the initial hardening option is a best hardening option for the information handling system, in response to passing of the end-to-end tests; and
repeating, in response to the information handling system not passing the end-to-end tests, and until a determination of a hardening option of the plurality of information handling system hardening configuration options is the best hardening option:
retrieving a next information handling system hardening configuration option from the plurality of information handling system hardening configuration options;
hardening the information handling system based, at least in part, on the next hardening configuration option;
running the information handling system hardening verification tool to verify that the information handling system is in compliance with the compliance checklist;
running the end-to-end tests on the information handling system, in response to verification that the information handling system is in compliance with the compliance checklist; and
determining the next hardening option is the best hardening option for the information handling system, in response to passing of the end-to-end tests.

16. The method of claim 15, wherein the method further comprises:
repeating, in response to the information handling system not being in compliance with the compliance checklist following hardening the information handling system based, at least in part, on the initial hardening configuration option, and until the determination of a hardening option of the plurality of information handling system hardening configuration options is best hardening option:
retrieving the next information handling system hardening configuration option from the plurality of information handling system hardening configuration options;
hardening the information handling system based, at least in part, on the next hardening configuration option;
running the information handling system hardening verification tool to verify that the information handling system is in compliance with the compliance checklist;
running the end-to-end tests on the information handling system, in response to verification that the information handling system is in compliance with the compliance checklist; and
determining the next hardening option is best hardening option for the information handling system in response to passing of the end-to-end tests.

17. The method of claim 15, wherein the method further comprises checking stability of the information handling system after running the end-to-end tests on the information handling system.

18. The method of claim 15, wherein the compliance checklist is a United States Department of Commerce National Institute for Standards and Testing National Checklist Program checklist that conforms to a Security Content Automation Protocol.

19. The method of claim 15, wherein the information handling system hardening verification tool is created by a manufacturer of the information handling system.

20. The method of claim 15, wherein the compliance checklist is created by a manufacturer of the information handling system.

* * * * *